Nov. 26, 1946. J. L. SMITH 2,411,597
CLOCK
Filed Feb. 5, 1944
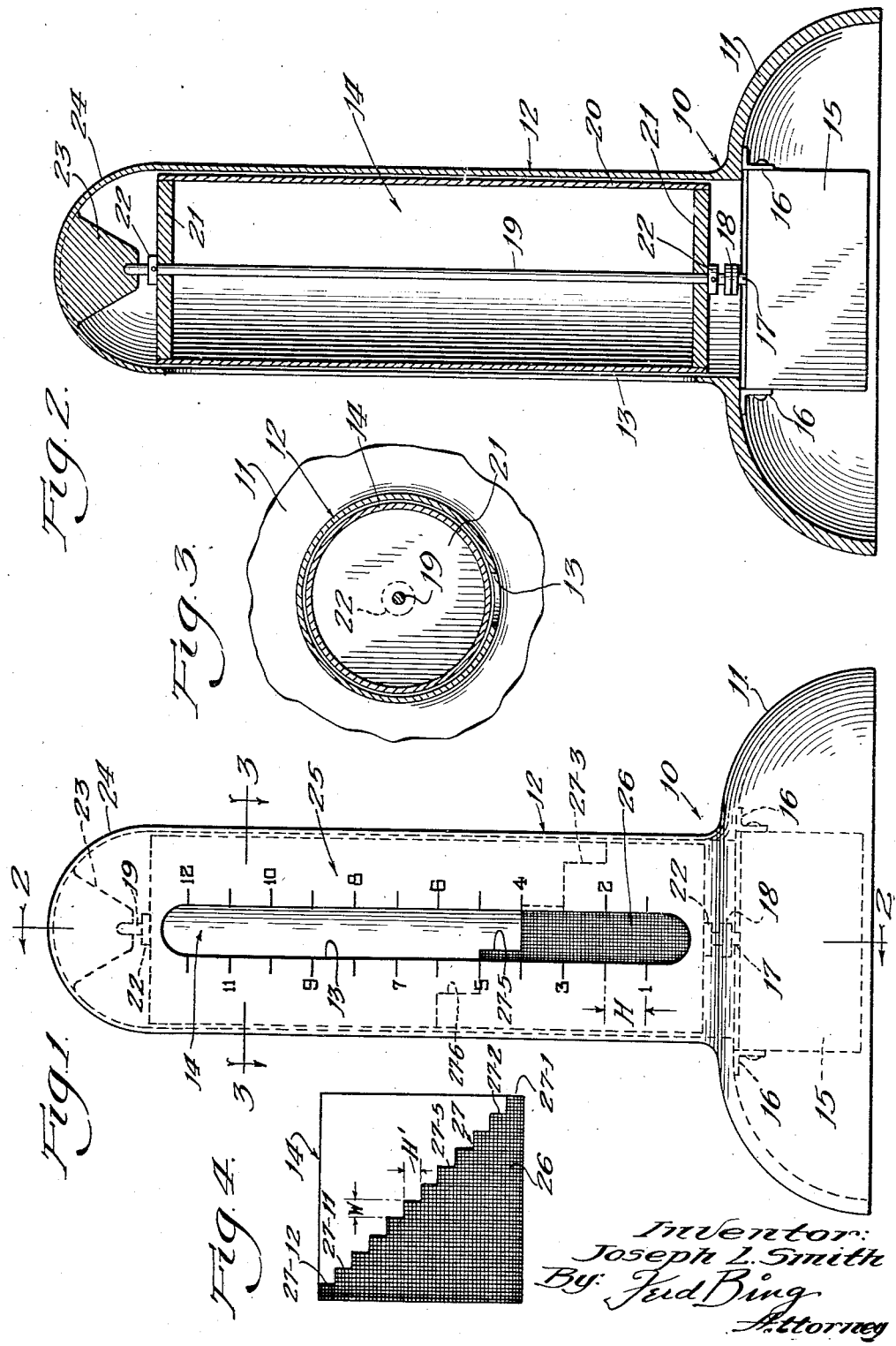
Inventor:
Joseph L. Smith
By: Fred Bing
Attorney Patented Nov. 26, 1946

2,411,597

UNITED STATES PATENT OFFICE 2,411,597

CLOCK

Joseph L. Smith, Chicago, Ill.

Application February 5, 1944, Serial No. 521,190

8 Claims. (Cl. 58—126)

This invention relates to clocks and particularly to the construction and arrangement of the time-indicating face thereof.

While clocks have heretofore been constructed with clock faces which afford an indication of time along an elongated substantially rectilinear scale usually disposed in a vertical position, such clocks have been relatively complicated in their structure, and in view of this, the primary object of the present invention is to enable such a clock to be constructed through the use of structure which is relatively simple and inexpensive in character. An object relating to the foregoing is to enable a clock having such a vertically extended time-indicating scale to also afford an indication of the minutes of the hour.

In prior clocks employing an elongated rectilinear time-indicating scale, the desired indication of time has been afforded solely by measurement along the scale lengthwise thereof, and it is a further object of the present invention to enable the indication of the hour to be so determined by measurement or indication along the axis of the scale and to indicate the minutes of the hour by measurement transversely of the axis of the hour-indicating scale. Further and related objects of the invention are to enable such a clock to be so constructed that the production thereof from a molded material is facilitated and simplified, and a further object is to simplify the construction and assembly of clocks of the aforesaid character.

Other and further objects of the present invention will be apparent from the following description and claims and are illustrated in the accompanying drawing which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawing:

Fig. 1 is a front elevational view of a clock embodying the features of the present invention;

Fig. 2 is a vertical sectional view of the clock taken along the line 2—2 of Fig. 1;

Fig. 3 is a fragmental horizontal sectional view taken along the line 3—3 of Fig. 1; and Fig. 4 is a diagrammatic view showing a development of the outer surface of the rotating drum of the clock.

In the form chosen for disclosure herein, the invention is illustrated as embodied in a clock 10 having a hollow base 11 and an upstanding housing or column 12 formed on the base 11. The upstanding housing 12 has an elongated vertical slot 13 formed in the side wall thereof so as to expose the adjacent portion of the surface of a rotatable time-indicating drum 14 mounted within the housing 12. The drum 14 is so located within the housing 12 that the outer surface of the drum 14 is disposed adjacent to the slot 13.

The rotatable time indicating drum 14 is arranged to be driven by a suitable clock movement 15 of substantially conventional construction, such clock movement being supported within the hollow base 11 by means such as brackets 16. The arrangement of the clock movement 15 is such that the driven output shaft 17 thereof is extended upwardly in a vertical direction into the column or housing 12 on the axis of the rotatable time-indicating drum 14. With this arrangement, the clock movement 15 may serve to support the lower end of the drum 14 and this may be accomplished by a driving coupling 18 which connects with and serves to drive a vertical shaft 19 upon which the drum 14 is supported. In the present instance, the drum 14 comprises a cylindrical sleeve 20 having disk-like end walls 21 fixed in the opposite ends thereof. Such end walls have openings therein at the axis of the drum 14 and the shaft 19 is extended through these openings. Collars 22, fixed on the shaft 19 outside of the walls 21, serve to hold the drum 14 in a particular longitudinal position along the shaft 19.

It has been pointed out that the lower end of the shaft 19 is supported by the coupling 18 on the output shaft 17 of the clock movement in an axial relation to the shaft 17, and the upper end of the shaft is rotatably supported by means such as a depending bearing boss 23 formed on the inside surface of the upper wall 24 of the housing 12. The upper boss 23 has a suitable socket formed therein to rotatably receive the upper end of the shaft 19, and the arrangement of the shaft 17 and the bearing boss 23 is such that the surface of the drum 14 is disposed relatively close to the slot 13.

In accomplishing the objects of the present invention, the clock movement 15 is constructed in a conventional manner so that the output shaft 17 thereof makes one revolution in twelve hours, and thus the drum 14 moves through thirty degrees about its axis in each hour of the day, and this rate of movement is utilized under the present invention in affording an indication not only of the hour of the day, but also an indication as to the minutes of the hour. In accomplishing this result, the slot 13 is made of such a width that it subtends an angle of thirty degrees with respect to the rotative axis of the drum 14, and markings or indicia are afforded on the surface of the drum which cooperate with the width of the slot and also with a scale 25 formed along the edges of the slot 13. The scale 25 is, in the present instance, arranged to read upwardly along the slot and the scale is so calibrated that it affords an indication of the hours of the day successively as the scale is read upwardly along the slot. Thus the vertical distance, marked H in Fig. 1 of the drawing, represents one hour along the scale 25, and the indicia on the drum 14 are arranged to cooperate with a scale which is thus afforded. In accomplishing such cooperation, the outer surface of the drum 14 as herein shown has a contrasting area 26 which may be of a darker color than the remainder surface of the drum, and such contrasting area 26 is arranged to terminate at its upper edge in a plurality of steps 27, the horizontal width W of each step 27, as indicated in Fig. 4, being equal to the width of the slot 13. In other words, the horizontal width W is such that each step 27 subtends a thirty degree angle with respect to the axis of the drum 14. The vertical height of each of the steps 27 is coordinated with the calibration of the scale 25, and to this end, each step 27 has a vertical height H', Fig. 4, which is equal to the distance H, as shown in Fig. 1, and in this connection, it should be observed that the diagrammatic showing in Fig. 4 is on a smaller scale than the showing in Fig. 1. The steps 27 are allocated one to each hour indicated on the scale 25, and in Figs. 1 and 4 the hours to be indicated by certain of the steps 27 are designated by an appropriate suffix added to the reference number 27 in such instance.

With the construction as thus described, the rotation of the drum 14 operates successively to bring the steps 27 into view opposite the slot 13, and the rotation of the drum 14 is in such direction that each step 27 is moved across the slot 13 from left to right, as viewed in Fig. 1. As a result, when a particular step is moved into view within and at the left side of the slot 13, such step indicates the hour of the day by its relationship to the graduation along the scale 25, and as the step moves across the slot 13, such progress from left to right across the slot indicates the minutes of the hour. Thus, as illustrated in Fig. 1 of the drawing, the step 27—5 is in view in the slot 13, and the position of the index line or mark afforded by the vertical edge of the step 27—5 transversely of the slot indicates that the time is fifteen minutes after five o'clock. As the hour between five and six o'clock passes, the step 27—5 will move progressively closer to the right hand edge of the slot 13, and at six o'clock, the step 27—6 will come into view at the left hand edge of the slot 13 so that the hour will be indicated by the disposition of the step 27—6 in view in the slot, while the passage of the minutes of the hour will be progressively indicated as the hour passes by movement of the step 27—6 transversely across the slot.

In the foregoing description, the invention has been set forth as applied to an extremely simple form of clock, and the form of this clock is such that a simple and inexpensive clock movement may be employed. Moreover, it will be clear that in the present invention it may also be utilized in clocks wherein a more complicated and expensive clock movement is to be used, and in such an instance, an additional drum with an indicating slot calibrated and graduated in minutes would be associated with the minute indicating shaft of such a more complicated clock movement.

It will be apparent from the foregoing that the present invention enables clocks to be constructed in a simple and economical manner, and the arrangement is such that the time-indicating parts of the clock as well as the casing thereof are adapted for economical production by processes of molding. It will also be evident that the clock of the present invention enables the time-indicating member to cooperate not only with the longitudinal scale of the clock face, but also with the width of the slot through which the time-indicating member is exposed.

While I have illustrated and described a selected embodiment of my invention, it is to be understood that this is capable of variation and modification and I therefore do not wish to be limited to the precise details set forth but desire to avail myself of such changes and alterations as fall within the purview of the following claims.

I claim:

1. In a clock, an elongated housing, a drum mounted for rotation in said housing, a clock movement in said housing operatively connected to said drum to rotate said drum through one revolution in twelve hours, said housing having an elongated slot formed therein parallel to the rotative axis of said drum and of such a width as to subtend an angle of thirty degrees with respect to said axis, means on the outside of said housing affording a scale extending longitudinally of said slot and calibrated in hourly units graduated in succession from one to twelve, means on said drum affording twelve index marks spaced thirty degrees apart about said drum and each allocated to a different hour of the day from one to twelve and respectively disposed on said drum to move into view opposite said slot in succession and opposite the related hourly unit as an incident to the rotation of said drum by said clock movement.

2. In a clock, an elongated upstanding housing, a drum mounted for rotation on a vertical axis within said housing, a clock movement in said housing operatively connected to said drum to rotate said drum through one revolution in twelve hours, said housing having an elongated vertical slot formed therein parallel to the rotative axis of said drum and of such a width as to subtend an angle of thirty degrees with respect to said axis, means on the outside of said housing affording a scale extending longitudinally of said slot and calibrated in hourly units progressively from one to twelve, means on said drum affording twelve index lines spaced thirty degrees apart about said drum and each allocated to a different hour of the day from one to twelve and disposed on said drum to move into view in said slot in succession and opposite the related hourly unit as an incident to the rotation of said drum.

3. In a clock, a housing having an elongated upstanding hollow portion with an elongated vertical slot of predetermined uniform width formed therein longitudinally thereof, a drum mounted in said housing for rotation on a vertical axis parallel to said slot and with the cylindrical face of the drum closely adjacent to said slot, means on the outer surface of said drum providing an area of contrasting color terminating in an upper step-like edge having twelve steps the width of each of which is such as to subtend an angle of thirty degrees with respect to the axis of the drum and the height of all of such steps being equal, means along the sides of said slot forming a scale graduated in hours from one to twelve in succession and having the hourly divisions each equal to the height of one step, a clock movement connected to said drum to rotate the same through one revolution in twelve hours, said predetermined width of said slot being such as to subtend an angle of thirty degrees with respect to the rotative axis of said drum.

4. In a clock, a housing having an elongated hollow portion with an elongated slot of predetermined uniform width formed therein longitudinally thereof, a drum mounted in said housing for rotation on an axis parallel to said slot and with the cylindrical face of the drum disposed closely adjacent to said slot, means on the outer surface of said drum providing an area of contrasting color terminating in a step-like edge having twelve steps the width of each of which in a direction circumferentially of the drum is such as to subtend an angle of thirty degrees with respect to the axis of the drum and the height of all of such steps in a direction longitudinally of the drum being equal, means along the sides of said slot forming a scale graduated in hours progressively from one to twelve in succession and having the hourly divisions each equal to the height of one step, a clock movement connected to said drum to rotate the same through one revolution in twelve hours, said predetermined width of said slot being such as to subtend an angle of thirty degrees with respect to the rotative axis of said drum.

5. In a clock, a housing having a downwardly opening hollow base and an upwardly extending elongated hollow portion closed at its upper end by an end wall and opening downwardly into said hollow base, said upstanding hollow portion having an elongated slot of predetermined uniform width formed therein longitudinally thereof an elongated drum disposed vertically in said housing, cooperating bearing means on the upper end of said drum and on the upper wall of said elongated hollow portion to support said upper end for rotation about a vertical axis parallel to said slot and with the cylindrical face of the drum closely adjacent to said slot, means on the outer surface of said drum providing an area of contrasting color terminating in an upper step-like edge having twelve steps the width of each of which is such as to subtend an angle of thirty degrees and the height of all of such steps being equal, means along the sides of said slot forming a scale graduated in hours from one to twelve in succession and having the hourly divisions each equal to the height of one step, a clock movement disposed in said base and having an output shaft connected to said drum to support the lower end of the drum and rotate the same through one revolution in twelve hours, the predetermined width of said slot being such as to subtend an angle of thirty degrees with respect to the rotative axis of said drum, and means supporting said clock movement in said base to thereby hold said bearing means in cooperating relation and support the lower end of said drum for rotation on the desired axis.

6. In a clock, a housing having a downwardly opening hollow base and an upwardly extending elongated hollow portion closed at its upper end by an end wall and opening downwardly into said hollow base, said upstanding hollow portion having an elongated slot of predetermined uniform width formed therein longitudinally thereof an elongated drum disposed vertically in said housing, cooperating bearing means on the upper end of said drum and on the upper wall of said elongated hollow portion to support said upper end for rotation about a vertical axis parallel to said slot and with the cylindrical face of the drum closely adjacent to said slot, means on the outer surface of said drum affording a step-like outline having twelve steps the width of each of which is such as to subtend an angle of thirty degrees and the height of all of such steps being equal, means along the sides of said slot forming a scale graduated in hours from one to twelve in succession and having the hourly divisions each equal to the height of one step, a clock movement disposed in said base and having an output shaft connected to said drum to support the lower end of the drum and rotate the same through one revolution in twelve hours, the predetermined width of said slot being such as to subtend an angle of thirty degrees with respect to the rotative axis of said drum, and means supporting said clock movement in said base.

7. In a clock, an elongated housing, a drum mounted for rotation in said housing, a clock movement in said housing operatively connected to said drum to rotate said drum through one revolution in twelve hours, said housing having an elongated slot formed therein parallel to the rotative axis of said drum and of such a width as to subtend an angle of thirty degrees with respect to said axis, means on the outside of said housing affording a scale extending longitudinally of said slot and calibrated in hourly units graduated in succession from one to twelve, indicia on said drum affording a step-like outline providing a series of twelve steps the width of each of which in a direction circumferentially of the drum is such as to subtend an angle of thirty degrees with respect to the axis of the drum, and the height of each step in a direction longitudinally of the drum being equal to the extent of one of said hourly units of said scale, said steps being allocated one to each of the hours of the day from one to twelve and being disposed on said drum to move into view opposite said slot in succession and opposite the related hourly unit as an incident to the rotation of said drum by said clock movement.

8. In a clock, an elongated housing, a drum mounted for rotation in said housing, a clock movement in said housing operatively connected to said drum to rotate said drum through one revolution during a predetermined number of major time units, said housing having an elongated slot formed therein parallel to the rotative axis of said drum and of such a width as to subtend a predetermined angle with respect to said axis which is equal to three hundred sixty degrees divided by said predetermined number, means on the outside of said housing affording a scale extending longitudinally of said slot and calibrated in time units graduated in succession from one up to said predetermined number, indicia on said drum affording a step-like outline providing a succession of steps equal in number to said predetermined number of major time units, the width of each of which in a direction circumferentially of the drum is such as to subtend an angle equal to said predetermined angle with respect to the axis of the drum, and the height of each step in a direction longitudinally of the drum being equal to the extent of one of said time units of said scale, said steps being allocated one to each of the major time units from one to said predetermined number and being disposed on said drum to move into view opposite said slots in succession and opposite the related time unit of said scale as an incident to the rotation of said drum by said clock movement.

JOSEPH L. SMITH.